United States Patent [19]

Sowers

[11] Patent Number: 4,923,522
[45] Date of Patent: May 8, 1990

[54] METHOD AND DEVICE FOR CLEANING A SPRAY GUN ASSEMBLY

[75] Inventor: David A. Sowers, Coral Springs, Fla.

[73] Assignee: BSD Enterprises, Inc., Pompano Beach, Fla.

[21] Appl. No.: 299,010

[22] Filed: Jan. 19, 1989

[51] Int. Cl.$^5$ .............................................. B08B 3/02
[52] U.S. Cl. .................................. 134/22.1; 134/138; 134/166 R; 134/198; 134/200; 134/22.11; 134/22.12; 134/22.14; 134/22.18; 134/33; 134/102
[58] Field of Search ................ 134/138, 166 R, 167 R, 134/170, 198, 200, 102, 22.1, 22.11, 22.12, 22.14, 22.18, 33, 38, 139

[56] References Cited

U.S. PATENT DOCUMENTS

| | | | |
|---|---|---|---|
| 75,443 | 3/1868 | Milburn | 134/138 |
| 174,090 | 2/1876 | Puffer, Jr. | 134/138 |
| 289,737 | 12/1883 | Whittle | 134/138 |
| 1,051,669 | 1/1913 | Boesser | 134/138 |
| 2,786,000 | 3/1957 | Roach | 134/21 |
| 3,771,539 | 11/1973 | De Santis | 134/111 |
| 3,904,431 | 9/1975 | Dinerman | 134/171 |
| 4,025,363 | 5/1977 | De Santis | 134/111 |

Primary Examiner—Frankie L. Stinson
Attorney, Agent, or Firm—John H. Faro

[57] ABSTRACT

Method comprises positioning a spray gun and its cup-connecting means in a stationary support, and its gun cup in a rotatable cup holder in a closed chamber. Then, compressed air and cleaning liquid is passed through the gun and cup-connecting means, while simultaneously rotating the cup holder and spraying the exterior surfaces of the cup, gun, and cup-connecting means and the interior surfaces of the cup. In a preferred embodiment, the spray from the gun rotates the cup holder. The device comprises the chamber, the gun support, a rotatable cup holder, a pool for cleaning liquid, spraying means, internal means for filtering and distributing cleaning liquid to the cup connecting means and the spraying means, and means for introducing compressed air from outside the chamber into a compressed-air manifold and then distributing the compressed-air to the gun and spraying means. The device also includes means for venting air that is exhausting from the chamber and means for absorbing fumes in the exhausting air.

15 Claims, 3 Drawing Sheets

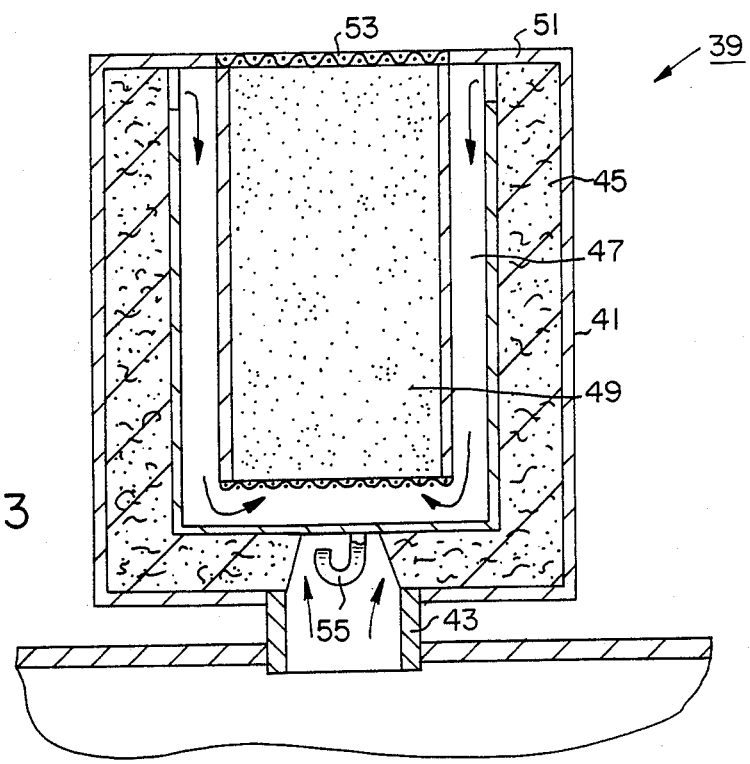
FIG. 3
FIG. 4
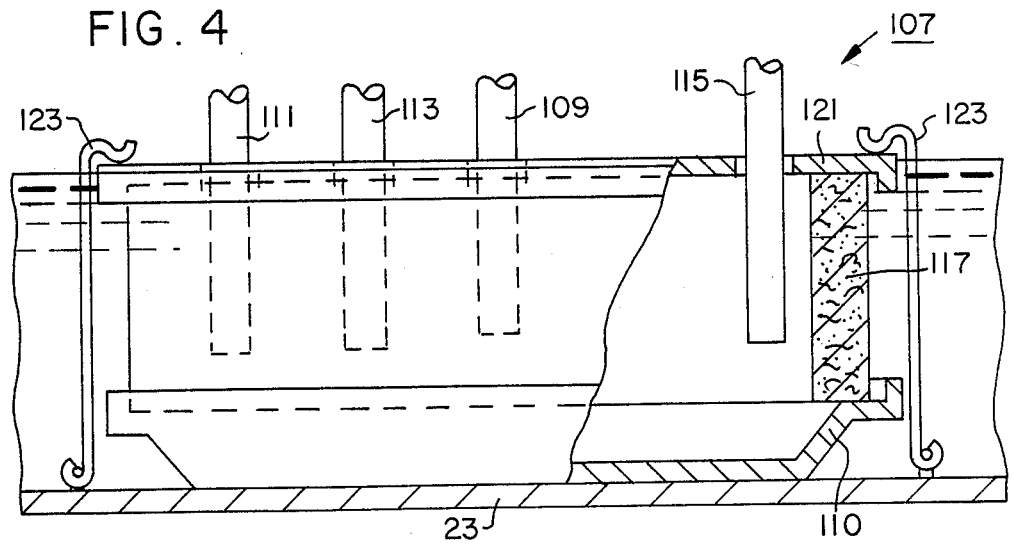

METHOD AND DEVICE FOR CLEANING A SPRAY GUN ASSEMBLY

BACKGROUND OF THE INVENTION

1. Field of the Invention—This invention relates to a novel method and device for cleaning a spray gun assembly that is contaminated with liquid spray material of any type. The novel cleaning method and cleaning device is especially useful for removing residual rapidly-curing spray paint from all of the inside and outside surfaces of a spray gun assembly.

2. Description of the Prior Art—A spray gun assembly includes a spray gun, a gun cup having an open end for storing liquid spray material, such as spray paint, while the gun is being used and means for operatively connecting the gun cup to the gun. The gun assembly may be of the siphon-feed type, the gravity-feed type, or the forced-feed type.

With any of these types, it is absolutely necessary to thoroughly clean all parts of the assembly of spray material promptly after every use. In an automobile body repair shop, it is common practice to use a spray gun assembly several times in a single day with different paints. Cleaning the spray gun assembly after each use is ordinarily a time consuming and labor intensive task. With the increasing use of catalyzed spray paints, the cleaning problem is aggravated because residual paint in the spray gun assembly cures in a much shorter time than do uncatalyzed paints. Spray paints and spray-painting equipment are described in *Automotive Collision Work* by Edward D. Spicer, American Technical Society, Chicago, 1972 and *Paint & Body Handbook* by Don Taylor and Larry Hofer, HP Books, Tucson, Arizona, 1984.

Several devices for cleaning or washing contaminated tools are described in prior patents, for example, U.S. Pat. Nos. 3,416,544 issued to J. Paiva; 4,101,340 issued to B. Rand; 4,108,379 issued to H. J. Talley; 4,443,269 issued to J. A. Capella et al.; 4,561,903 issued to R. L. Blaul; 4,612,025 issued to R. W. Sampey; and 4,630,625 issued to J. A. Capella et al.

Each of these prior devices is relatively bulky and requires considerable hand manipulation of the tools by the operator for carrying out the cleaning. Because of the size of these prior devices, noise generated therein is not well contained. Some of the prior devices include blowers for circulating vapor-laden air in the devices and/or pumps for circulating liquid solvents in the system. The use of such blowers and/or pumps on combustible liquids and vapors is hazardous and requires substantial safety precautions to be taken. In general, these prior devices are not particulary adapted for cleaning spray-gun assemblies, and are especially not adapted for use in automobile body repair shops.

OBJECTS OF THE INVENTION

An object of this invention is to provide a novel method and a novel device for cleaning a spray gun assembly.

A further object is to provide a device of this type which is relatively compact, relatively light in weight and relatively low in cost.

Another object is to provide a device of this type which requires a minimum of labor and time to thoroughly clean a spray gun assembly.

A still further object is to provide a device of this type that is powered entirely by compressed air, does not employ electricity or blowers or pumps and is provided with a means for protecting personnel from noxious fumes and from excessive noise.

Another object is to provide a novel method and a novel device that is particularly adapted for rapidly cleaning residual catalyzed spray paint from spray-gun assemblies in automobile body repair shops.

SUMMARY OF THE INVENTION

The foregoing objects may be realized with the novel method and novel device for cleaning a spray gun assembly which includes a spray gun, a gun cup, and a means for operatively connecting the cup to the gun. The method includes:

(a) positioning the spray gun, with the cup-connecting means attached thereto, on a stationary support in a closed chamber, (b) positioning the gun cup in a rotatable cup holder in the closed chamber, (c) passing compressed air and cleaning liquid through the interior of the gun and the cup-connecting means, and (d) simultaneously with step (c), rotating the cup holder, spraying the exterior surfaces of the gun, the cup-connecting means, and the rotating cup with cleaning liquid, and spraying the interior surfaces of the rotating cup with cleaning liquid.

In a preferred embodiment, the spray produced by cleaning the interior surfaces of the gun is used to rotate the cup holder and the cup contained therein. The method includes supplying compressed air from outside the chamber and exhausting air from the chamber. The method preferably includes the steps of filtering the cleaning liquid and absorbing fumes in the air exhausting from the chamber.

The novel device includes a closed chamber which has therein: (a) a rotatable cup holder for holding the gun cup with its open end downward, (b) a means for spraying the inside of the gun cup when it is held in the cup holder, (c) a stationary gun support for holding the spray gun, (d) a means for producing an air jet (which may be sprayed from the gun) which interacts to rotate the cup holder, (e) means for supplying compressed air to the gun support, to the air jet-producing means and to the cup-spraying means, and (f) means for supplying cleaning liquid to the gun support and the cup-spraying means.

In one form of use, the novel device, the spray gun and the cup-connecting means are installed on the gun support, and the gun cup is installed, open end downward, in the cup holder. Compressed air from outside the chamber is passed into a manifold inside the chamber and then distributed to the gun support and the cup-spraying means. Simultaneously, cleaning liquid from a pool of liquid is drawn into the gun and sprayed out, thereby cleaning the inside surfaces of the gun. The spray from the gun is directed to cause the cup holder to rotate and to clean the outside surfaces of the cup. Also, spray from the cup-spraying means sprays the lip and insides of the rotating gun cup, cleaning the inside surfaces of the cup.

In the preferred embodiments, at least two (2) auxiliary spray nozzles, similarly connected to the manifold and the liquid in the pool, spray cleaning liquid against and thereby cleaning the outer surfaces of the spray gun and the attached gun-cup connecting means. The preferred embodiments of the novel device also includes a filter inside the chamber for fitering cleaning liquid drawn from the liquid pool, and a relief vent in a wall of the chamber covered with fume-absorbent material. In one arrangement, the relief vent has attached thereto a cartridge providing an upwardly-directed path, first through a porous medium and then through a mass of activated charcoal. A return means including a return trap is provided in the cartridge for liquids captured in the path which are draining back through the vent.

In all of the embodiments, the novel device is powered entirely by compressed air. The novel device does not employ electricity, blowers or pumps. All of the active parts are entirely enclosed in the chamber thereby protecting personnel from noxious fumes and from excessive noise, particularly the noise generated by compressed air escaping through he various nozzles in the device.

The novel device is relatively compact, relatively light in weight, and relatively low in cost. Nevertheless, a minimum of labor and time is required to install, thoroughly clean, and remove a spray gun assembly from the novel device. The entire cycle is easily completed in a few minutes, making the novel method and novel device ideal for use in job shops.

BRIEF DESCRIPTION OF THE DRAWINGS

FIG. 3 is a fragmentary sectional view of the fume-absorption means mounted in the cover of the embodiment shown in FIG. 1.

FIG. 4 is a fragmentary, partially broken-away elevational view of the liquid filter in the bottom of the chamber shown in FIGS. 1 and 2.

DETAILED DESCRIPTION OF THE INVENTION INCLUDING THE PREFERRED EMBODIMENTS

Figure 1:
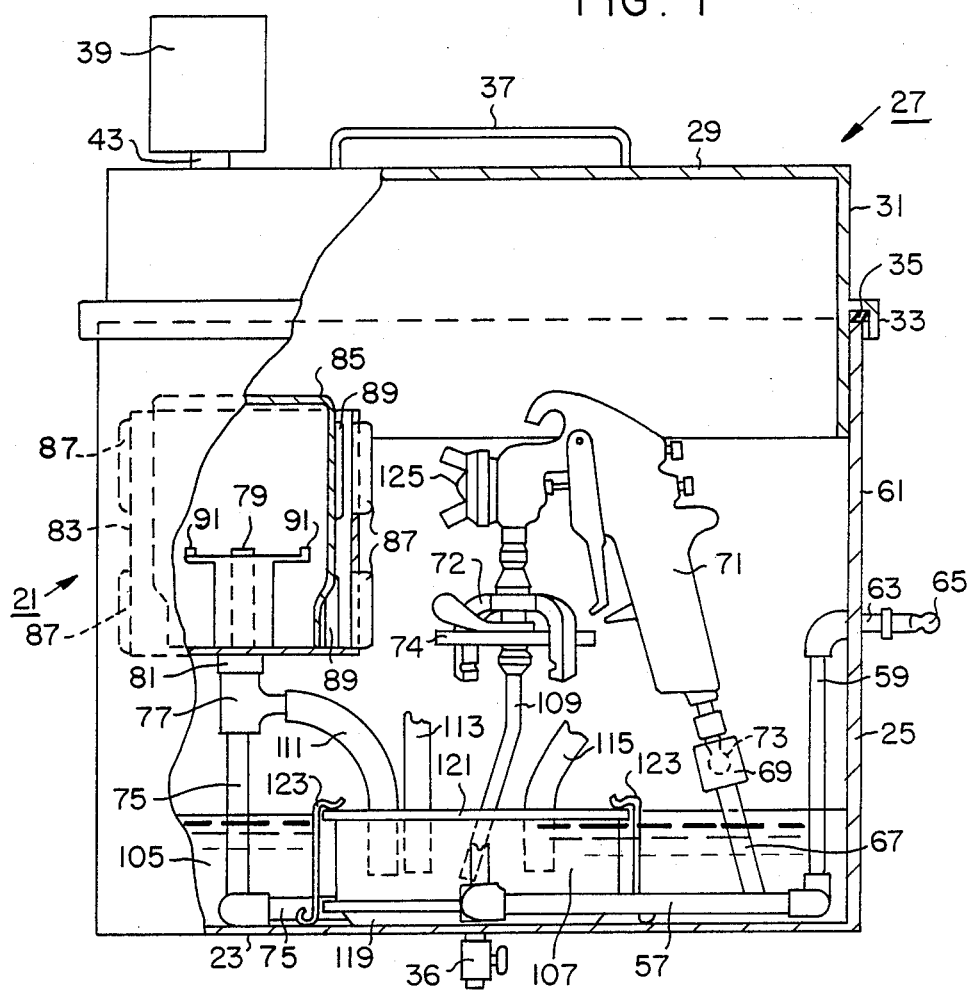
FIG. 1 is a partially broken-away elevational view of a preferred embodiment of the novel device with a spray gun assembly mounted therein and the cover in place.

The following description of some of the preferred embodiments of the concepts of this invention is made in reference to the accompanying figures. Where an individual structural element is depicted in more than one figure, it is assigned a common reference numeral for simplification of identification and understanding.

Figure 2:
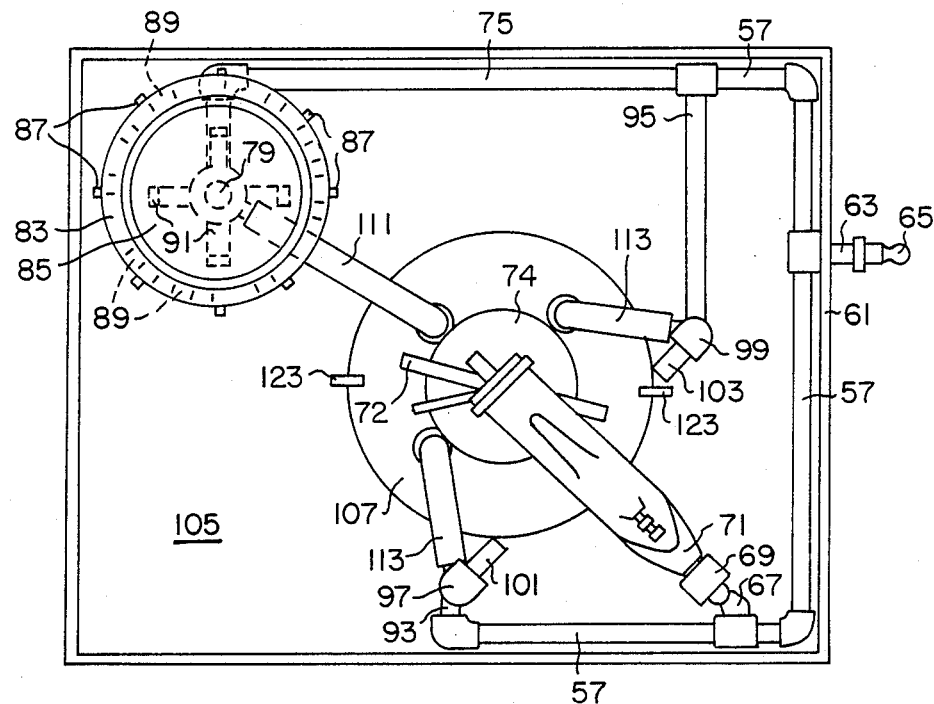
FIG. 2 is a plan view of the embodiment shown in FIG. 1 with the cover removed.

The preferred embodiment of the novel device shown in FIGS. 1 and 2 comprises a closed generally rectangular chamber (21) comprising a bottom wall (23), main side walls (25) integral with the bottom wall (23) and a removable cover (27). The cover (27) includes a top wall (29), auxiliary side walls (31) that are integral with the top wall (29) and fit closely inside the main sidewalls (25), and a liquid-resistant seal (33) that rests on the top edges of the main sidewalls (25). The seal (33) is a downward-opening groove around the auxiliary sidewalls (31) formed by attaching an angle-piece to the outside surfaces of the auxiliary sidewalls (31).

All of the parts of the chamber (21) are preferably fabricated from metal stock, preferably one-quarter inch (¼ in.) aluminum-alloy sheet and one-half inch by one-half inch (½ in. × ½ in.) aluminum angle. The overall dimensions of the covered chamber (21) is about twenty inches (20 in.) wide, about twenty inches (20 in.) high and about fifteen inches (15 in.) deep. The auxiliary sidewalls (31) are about seven inches (7 in.) high and overlap the main sidewalls (25) by about three inches (3 in.). The seal (33) includes a gasket (35) that rests between the upper edge of the main side walls (25) and the attached angle piece. There is a drain hole in about the center of the bottom wall (23) for draining liquid from the inside of the chamber (21) through a drain valve (36).

The cover (27) includes a handle (37) of three-eighths inch (⅜ in.) diameter aluminum-alloy rod that is bent and attached at its ends to the outside surface of the top wall (29). The cover (27) includes also a means (39), shown in greater detail in FIG. 3, for absorbing fumes in the air escaping from inside the chamber (21) when the device is in operation. As shown in FIG. 3, the fume-absorption means (39) includes a cylindrical cannister (41) having a threaded cannister nipple (43) screwed into a two-inch diameter vent aperture in the top wall (29). The cannister (41) has solid sides and contains an annular first region (45) from the cannister nipple (43), a annular second region of open space (47) permitting the filtered air to flow downward inside the first annular region (45), a central cylindrical third region (49) of activated charcoal particles for absorbing fumes from filtered air passing upwardly through the charcoal, and a top closure (51) having an open screen (53) permitting filtered and fume-reduced air to escape from the cannister (41). There is a liquid "J-shaped" trap (55) between the first and second regions permitting the back flow of liquid and blocking the back flow of filtered air.

As shown in FIGS. 1 and 2, a tubular compressed air manifold (57) extends along the lower inside corners of the chamber (21). A first supply segment (59) of the manifold extends upward along the inside surface of one sidewall (61) and connects to a tubular supply nipple (63) which extends through the one sidewall (61) and terminates in a chamber compressed-air connection means (65) for a source of compressed air. A second tubular segment (67) extends along the bottom inside of the chamber (21) and then upward at an angle terminating in a gun fitting (69) for receiving the compressed-air connection means (78) on a spray gun (71) and for supporting the spray gun (71) in a position to direct a spray whose axis is about horizontal as shown in FIG. 1. The cup-connecting means (72) including the cover (74) for the cup (85) is attached to the gun (71).

The manifold has a third tubular segment (75) which extends along the bottom inside of the chamber (21) terminating in a first venturi connection (77). A first nozzle (79) extends upwardly from the discharge side of the first venturi (77). A freely movable circular spacer (81) and then a rotatable cup holder (83) rests on the first venturi connection (77) around the first nozzle (79). The cup holder (83) can hold the spray cup (85) with its open end downward. The cup holder (83) has vanes (87) to catch the spray from the gun (71) whereby to rotate the cup holder (83). The cup holder (83) also has vertical rows of open slots (89) to allow spray from the gun (71) to impinge on the outside of the cup (85) and to allow the liquid to drain away from the cup holder (83). The cup holder (83) also has stabilizing blades (91) inside the cup (85) to reduce rocking by the cup (85) as it rotates in the cup holder.

The manifold (57) also has a third tubular segment (93) and a fourth tubular segment (95) which extend inwardly along the bottom of the chamber (21) and then upwardly, each segment terminating in a second and a third venturi connection (97 and 99, respectively). A second and a third nozzle (101 and 103) extend from the discharge sides of the second and third venturi connections (97 and 99, respectively) in a generally horizontal direction directed at each side of the spray gun (71). The second and third venturi connections (97 and 99) and nozzles (101 and 103) are shown in FIG. 2, but not in FIG. 1 in order to simply the drawing.

A pool of cleaning liquid (105) is in the bottom of the chamber (21) to a depth of about three to four inches (3 to 4 in.). A filter (107) for the liquid is positioned on the bottom of the chamber (21) in the pool (105) to be under the spray gun (71) when it is mounted on the gun fitting (69). The gun siphon tube (109) of the gun (71) extends into the center of the filter (107). Also, first, second and third siphon tubes (111, 113 and 115) extend from the suction ports of the first, second and third venturi connections (77, 97 and 99, respectively) into the filter (107) around the gun siphon tube (109).

The filter (107) for the cleaning liquid is shown in more detail in FIG. 4. The filter (107) comprises an annular porous filter element (117) clamped between a circular bottom plate (119) and a circular metal top plate (121) by clamps (123) which are attached to bottom wall (23) of the chamber (21). The cleaning liquid (105) of the pool completely fills the filter (107) with the surface (127) of the pool at about the level of the top plate (121). The top plate (121) has a plurality of holes through which the siphon tubes (109, 111, 113 and 115) pass.

To practice the novel method and to use the preferred embodiment shown in FIGS. 1 and 2, a spray gun (71) with the cup connection means (72) attached is mounted on the gun positioning means by pressing the gun compressed-air connection means (73) of the spray gun (71) into the gun fitting (69), and with the siphon tube (109) in the filter (107). With this mounting, the gun (71) can be positioned any where along an arc which points the spray axis of the gun along a line across the cup holder (83). A gun position is chosen which will impinge the spray from the gun (71) on the vanes (87) so as to rotate the cup holder (83). The gun cup (85) is placed open end down in the cup holder (83). Cleaning liquid (105) is in pool at the bottom of the chamber (21). The cover (27) is placed in position as shown in FIG. 1. Then, a source of compressed air of about 120 psi is connected to the chamber compressed air connection means (65).

Compressed air flows into the chamber (21) through the nipple (63) and into the header (57), where it is distributed to the gun (71), and the first, second and third venturi connections (77, 97 and 99, respectively). Compressed air flowing through the gun (71) and the venturi connections (77, 97 and 99) draws cleaning fluid from the filter (107) through the respective siphon tubes (109, 111, 113 and 115) and sprays it out through the gun nozzle (125) and first, second and third nozzles (79, 101 and 103). The spray from gun nozzle (125) rotates the cup holder (83) and cleans the outside of the cup (85). The spray from the first nozzle (79) cleans the inside of the cup (85). The spray from the second and third nozzles (101 and 103) cleans the cleans the outside surfaces of the gun (71). The air and cleaning liquid passing through the inside surfaces of the gun (71) cleans the insides of the gun.

The cleaning effect can be made more or less vigorous by increasing or decreasing, respectively, the air pressure introduced at the nipple (63). All of the sprayed liquid drains back into the pool of liquid (105), so that the surface level of the pool remains substantially constant. However, since the cleaning liquid (105) is drawn from the center of the filter (107), the draining liquid must pass through the porous filter element (117) to be recycled in the chamber (21). The compressed air introduced into the chamber (21) pushes air in the chamber (21) out through the cannister nipple (43) and the fume-absorption means (39) so that air pressure does not build up in the chamber (21). The cleaned gun assembly can be removed from the chamber (21) by turning off the air pressure, removing the cover (27) and taking out the cup (85) and the gun (71).

The cleaning step can be completed in time periods as short as thirty (30) seconds. The entire cycle of loading cleaning and unloading can be completed in periods as short as 120 seconds. Thus, in an ordinary job-type paint shop, a succession of many different paint jobs can be conducted with the same equipment without fear of contamination of the paints from one job into another. The amount of equipment required is greatly reduced and the amount of labor and time spent in cleaning the equipment is materially reduced. Equally important is that catalyzed paints, which set up in periods of time as short as thirty (30) minutes, can be used, and the residual paint in the spray gun assembly can be removed within minutes after the painting is completed thereby protecting the equipment from loss.

A feature of the novel method and device is that it is powered entirely with compressed air and that there is no buildup of pressure within the device. Thus, there is no danger of fire or combustion of the fumes from the paint or the cleaning fluid within the device. Any of various cleaning fluids can be used, and used should be governed by mandatory or recommended safety practice. A preferred cleaning fluid is a good grade of paint thinner. Methyl ethyl ketone can also be used although it is not preferred.

Another feature of the novel method and device is the low level of noise imposed on the environment. Although a large amount of compressed air passing out of the various nozzles of the novel device does generate substantial noise, the noise is contained in the chamber, which is closed. Also, since the cleaning cycle is very short, the duration of the generated noise is quite short.

There are many variations in both the method and the device. For example, the rotatable cup holder can be rotated with other compressed-air means such as a supplementary jet for that purpose. Also, the chamber can be designed to load two or more spray gun assemblies at one time. Also, one or more windows can be built into the walls of the chamber, and there can be other sealing arrangements between the main portion and the cover of the chamber.

The foregoing figures and descriptions thereof are provided as illustrative of some of the preferred embodiments of the concepts of this invention. While these embodiments represent what is regarded as the best modes for practicing this invention, they are not intended as delineating the scope of the invention which is set forth in the following claims.

What is claimed is:

1. A method for cleaning a spray gun assembly, said assembly comprising a spray gun, a gun cup, and means for operatively connecting said cup to said gun, said method comprising:
    (a) positioning said gun and said cup-connecting means on a stationary support in a closed chamber, (b) positioning said gun cup in a rotatable cup holder in said closed chamber,
(c) passing compressed air and cleaning liquid through the interior of said gun and said connecting means, and
(d) simultaneously with step (c), rotating said cup holder, spraying the exterior surfaces of said gun, cup-connecting means and rotating gun cup with cleaning liquid and spraying the interior surfaces of said rotating gun cup with cleaning liquid, and wherein said cup support is rotated by, and the exterior surfaces of said gun cup is cleaned by, a spray from said gun.

2. The method defined in claim 1 wherein there is a pool of cleaning liquid at the bottom of said chamber, and each of said spraying steps includes passing compressed air through a venturi device and siphoning cleaning liquid from said pool through said venturi device.

3. The method defined in claim 2 including introducing said compressed air from outside said chamber into a compressed-air header within said chamber, and then distributing said compressed air to each of said venturi devices.

4. A device for cleaning a spray gun assembly, said assembly comprising a spray gun, a gun cup, and means for operatively connecting said cup to said gun, said device comprising:
a closed chamber having therein:
a rotatable cup holder for holding said cup with its open end downward,
means for rotating said cup holder with compressed air,
means for spraying the inside of said cup with cleaning liquid when said cup is held in said cup holder,
a stationary gun support for said gun and said connecting means, said gun being positionable in said gun support to direct a spray therefrom into contact with said cup holder and to rotate said cup holder,
means for supplying compressed air and cleaning liquid to said gun when said gun is positioned in said gun support, and
means for supplying compressed air and cleaning liquid to said cup-spraying means.

5. The device defined in claim 4 including auxiliary spraying means for spraying the outside surfaces of said gun, auxiliary air-supply means for supplying compressed air to said auxiliary spraying means, and auxiliary liquid supply means for supplying cleaning liquid to said auxiliary spraying means.

6. The device defined in claim 4 wherein said chamber comprises a bottom wall, integral main side walls, and a removable cover, said cover including a top wall and integral auxiliary side walls, said auxiliary side walls fitting within said main side walls and having a liquid-resistant seal therebetween.

7. The device defined in claim 6 wherein said cup holder includes a stationary post upstanding from said bottom wall, and a cylindrical basket rotatably mounted at the upper end of said post, said basket having drainage means therein for draining liquid therefrom and vanes along the sides thereof for receiving said spray from said gun.

8. The device defined in claim 6 wherein said cup-spraying means includes a spray nozzle fixedly mounted on the upper extended end of said post for spraying cleaning liquid upwardly into said basket, and said means for supplying compressed air and cleaning liquid are operatively connected to said nozzle.

9. The device defined in claim 6 wherein said top wall has an air-pressure relief vent therein and containing means for holding absorption material over said vent for absorbing fumes in gases passing through said vent from said chamber.

10. The device defined in claim 6 wherein a shallow pool of cleaning liquid resides at the bottom of said chamber during the operation of said device and said compressed air supplying means includes a compressed air manifold within said chamber, operative tubular connections between said manifold and each of said gun support and said cup-spraying means, a tubular nipple through a wall of said chamber above pool of liquid, the inside end of said nipple being connected to said manifold and the outside end of said nipple having means for connection to a source of compressed air.

11. The device defined in claim 6 wherein a shallow pool of cleaning liquid resides at the bottom of said chamber during the operation of said device and said cleaning-liquid-supplying means comprises a filter for said cleaning liquid, said filter having an inlet port located in the liquid of said pool, an outlet port, and tubular means connecting said outlet port with said gun support and said cup-spraying means.

12. The device defined in claim 6 wherein said closed chamber includes means for accessing said chamber to install and remove said spray gun, said cup and said cup-connecting means, into and from said chamber.

13. The device defined in claim 6 wherein said cup holder rotating means comprises said spray gun mounted in said gun support, said spray gun being positionable in said gun support to produce a spray which interacts with said cup holder to rotate said cup holder.

14. A device for cleaning a spray-gun assembly, said assembly comprising a spray gun, a cup having an open end for storing liquid spray material therein, means for operatively connecting said cup to said gun, and means for operatively connecting said gun to source of compressed air, said device comprising:
a closed chamber comprising a bottom wall integral, main side wall, and a removable cover, said cover including a top wall and auxiliary side walls integral with said top wall, said auxiliary side walls fitting within said main side walls, said chamber having a liquid-resistant seal between said main side walls and said auxiliary side walls, said cover having an air-pressure relief vent therein and containing means for holding fume-absorption material over said vent, said chamber having a shallow pool of cleaning liquid at the bottom thereof during the operation of said device,
a rotatable cup holder for holding said cup with its open end downward, said cup holder including a stationary post attached to and upstanding from said bottom wall, a cylindrical basket rotatably mounted at the upper end of said post, said basket having openings therein for draining cleaning liquid therefrom, and vanes on the cylindrical sides of said basket,
cup-spraying means including a cup-spraying nozzle fixedly mounted on said upper end of said post for spraying cleaning liquid upwardly into said basket,
at least two (2) auxiliary spray nozzles positioned for spraying the outside surfaces of said gun,
a stationary gun support for said spray gun, said gun being positionable in said gun support to direct a spray therefrom into contact with said vanes on said basket to rotate said cup holder, a compressed-air-supplying means including a compressed air manifold within said chamber, tubular connections connecting said manifold with said cup-spraying nozzle, said gun support, and said auxiliary nozzles, a tubular nipple through a wall of said chamber above said pool of liquid, the inside end of said nipple being connected to said manifold and the outside end of said nipple having means of connection to a source of compressed air, and a cleaning-liquid-supplying means comprising a filter for said cleaning liquid, said filter having an inlet port located in said liquid pool, an outlet port, and tubular means for conducting cleaning liquid from said filter outlet port to said gun support, said cup-spraying means, and said auxiliary nozzles.

15. The device defined in claim 14 wherein said fume-absorption means is a cartridge providing a path for said gases in succession from said vent, a first upwardly-directed path portion through a porous medium, a second upwardly-directed path portion through a loose mass of activated charcoal, and a third path portion through an exhaust opening, said cartridge having a return means including a return trap for liquids captured in said path and draining back through said vent.

* * * * *